Inventors
Jay R. Borden
Everett R. Geis
Donald M. Lamaster
Stanley Krauthamer

By James J. Jennings, Jr.
Attorney

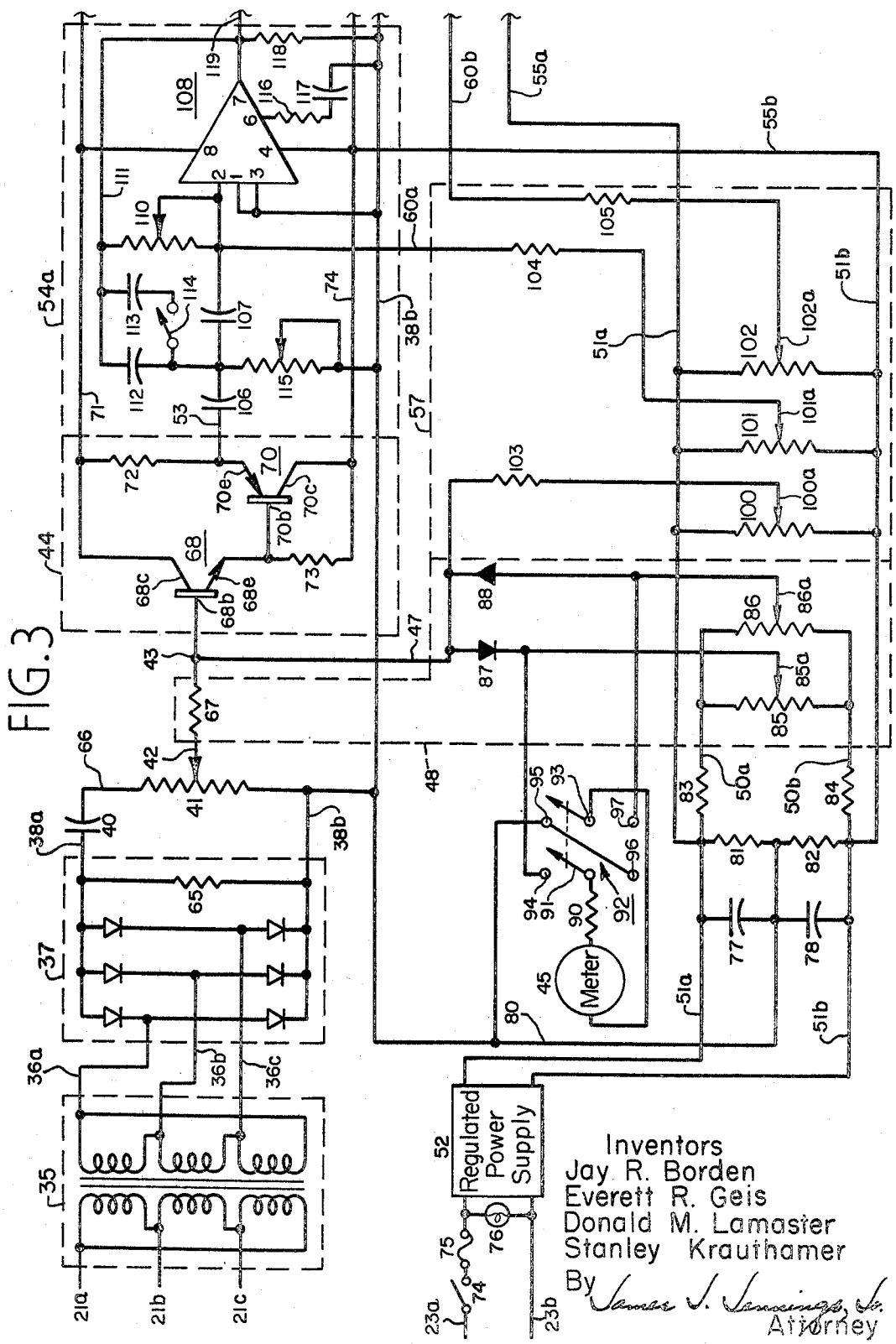

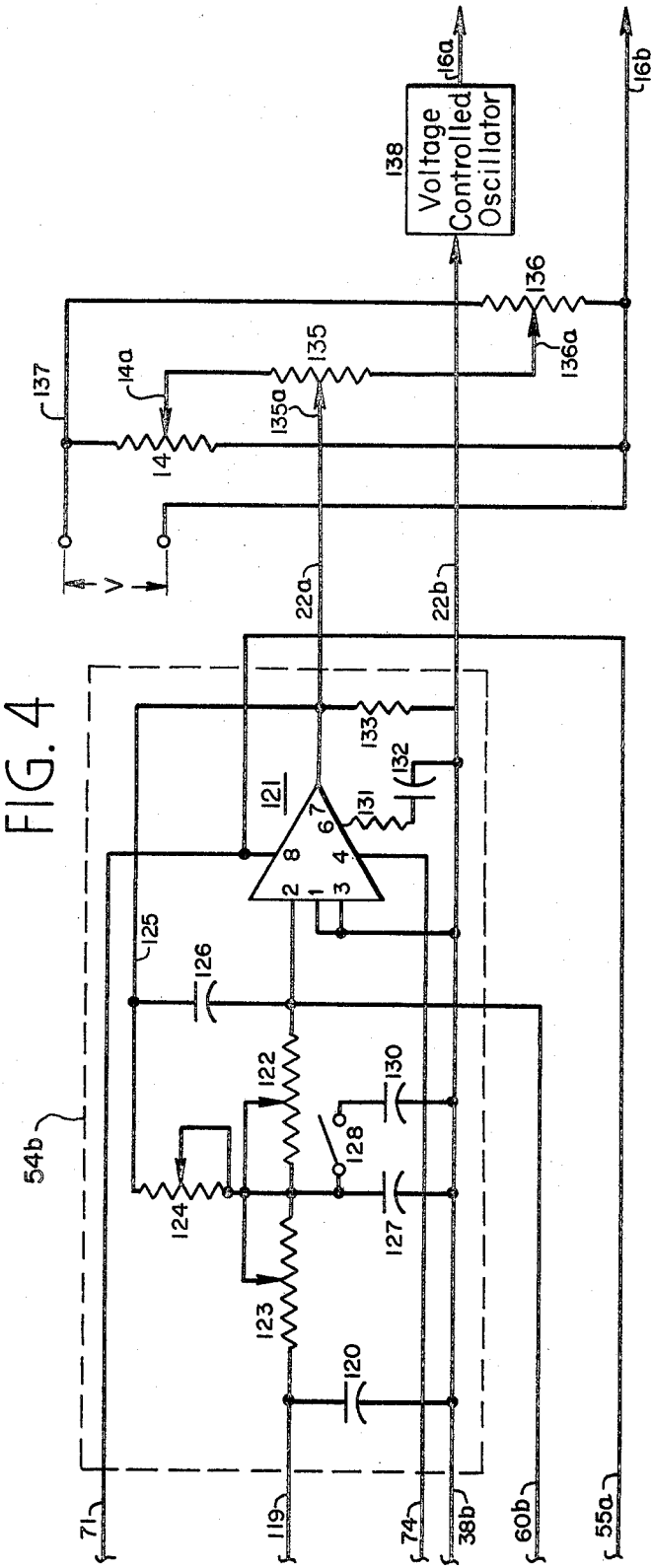

United States Patent Office 3,482,157
Patented Dec. 2, 1969

3,482,157
DEMODULATOR FOR CONTROLLING MOTOR TORQUE ANGLE TO STABILIZE A SYNCHRONOUS MOTOR ENERGIZED FROM AN INVERTER
Jay R. Borden, Santa Ana, Everett R. Geis, Orange, Donald M. Lamaster, Tustin, and Stanley Krauthamer, Monterey Park, Calif., assignors to Borg-Warner Corporation, Chicago, Ill., a corporation of Illinois
Filed Nov. 6, 1967, Ser. No. 680,677
Int. Cl. H02p 5/16
U.S. Cl. 318—227        12 Claims

ABSTRACT OF THE DISCLOSURE

When an A-C motor 10 energized from an inverter 12 undergoes motor instability, this instability is indicated as a modulation of the motor torque angle and produces related modulating currents. A demodulator 20 is connected to sense the undesired modulation signal and, by a transient change in the frequency of oscillator 15 which effects a similar change in the frequency of inverter A-C output voltage, offset the undesired modulation and restore the appropriate torque angle. The demodulator 20 includes transformer 35 and rectifier bridge 37 for providing a modulation signal, the D-C component of which is blocked by capacitor 40. The resultant modulation-indicating signal is gain-adjusted over potentiometer 41, and the positive and negative clipping levels of this signal are regulated by adjustments within clipping adjust circuit 48 and observed on meter 45. An impedance matching stage 44 passes the resultant signal to bandpass control circuit 54, in which the high and low frequency cutoff levels and the signal phase shift in the pass band are established, so that the corrective output signal from the demodulator is related only to undesired motor pulsation within the preset frequency range.

BACKGROUND OF THE INVENTION

With the advent of improved, high-power semiconductor switching devices it has become practical to drive an A-C motor with energy from a static inverter, and to control the frequency of the inverter output voltage to correspondingly regulate the motor speed. The term "motor," as used herein and in the appended claims, includes, (but is not limited to) synchronous reluctance motors, separately-excited synchronous motors, synchronous hysteresis motors, and induction motors. Instability of A-C motors has been observed with accompanying torque pulsations in the load. The instability is manifested as a modulation of the motor torque angle which produces the objectionable torque pulsations in the load. When the amplitude of this modulation is sufficiently large, a synchronous motor may skip a pole and very large surge currents flow through the motor windings. Frequently such operation results in misfiring of the semiconductor components in the inverter and may cause inverter failure. In this undesirable modulating condition, the level of the motor current oscillates around some mean value. Such modulation produces a modulation of the inverter turn-off time both above and below the design means turn-off time. When this modulation of the turn-off time is below the design mean value and of sufficiently large magnitude, it may lead to failure of the inverter.

Various attempts have been made to analyze the stability of such A-C machines. One such attempt is set out in a paper entitled "Stability Analysis of a Reluctance-Synchronous Machine" by T. A. Lipo and P. C. Krause, both of the University of Wisconsin at Madison, Wis. This paper, identified as #31 pp. 66–318, was recommended by the IEEE Rotating Machinery Committee of the IEEE Power Group for presentation at the IEEE summer power meeting in New Orleans, La., July 10–15, 1966. Like most such treatments idealized conditions were assumed for the analysis. For example a zero source impedance bus was assumed, whereas the practical values (much greater than zero) of the source impedance does make a significant difference. Important to a practical application of any stabilizing technique is a consideration of the interaction between the inverter and the motor which it energizes, but in the cited analysis the discussion is limited to the characteristics of the machine itself and not to any interaction between the synchronous motor and the inverter. Thus there still remains an urgent need for a control system both to protect the inverter and obviate motor instability in a speed control system wherein an inverter is connected to energize an A-C motor.

SUMMARY OF THE INVENTION

The demodulator arrangement of the present invention is particularly useful in combination with a motor control system of the type in which an inverter is connected to supply A-C voltage for energizing an A-C motor, an oscillator is connected to supply timing pulses to regulate the frequency of the inverter A-C output voltage, and the oscillator includes adjusting means for varying the frequency of the oscillator timing pulses to correspondingly vary the frequency of the inverter A-C output voltage and thus effect a related variation in the motor speed. The demodulator itself includes input means, which in the preferred embodiment comprises a transformer and a rectifier circuit, connected to provide a composite input signal, having both a D-C component and an A-C modulation signal, related to the amplitude and to the frequency of the A-C voltage supplied by the inverter to the motor. Circuit means, which may be a capacitor, is coupled to the input means for blocking the D-C component to prevent D-C frequency error which would adversely affect long term frequency accuracy, and passing only the A-C modulation signal of the composite input signal. A bandpass control circuit is coupled to the circuit means, and the bandpass control circuit includes means for regulating the low and high frequency cutoff levels of the A-C modulation signal. An adjustable clipping means is connected to determine the excusions of the A-C modulation signal before this signal is applied to the bandpass control circuit. The output signal produced by the bandpass control circuit is passed to the oscillator, thus changing the inverter output frequency to modify the motor torque angle and compensate for an undesired modulating signal present at the input circuit of the motor and stabilizing the motor control system.

THE DRAWINGS

In the several figures of the drawings like reference numerals identify like elements, and in the drawings.

Figure 2:
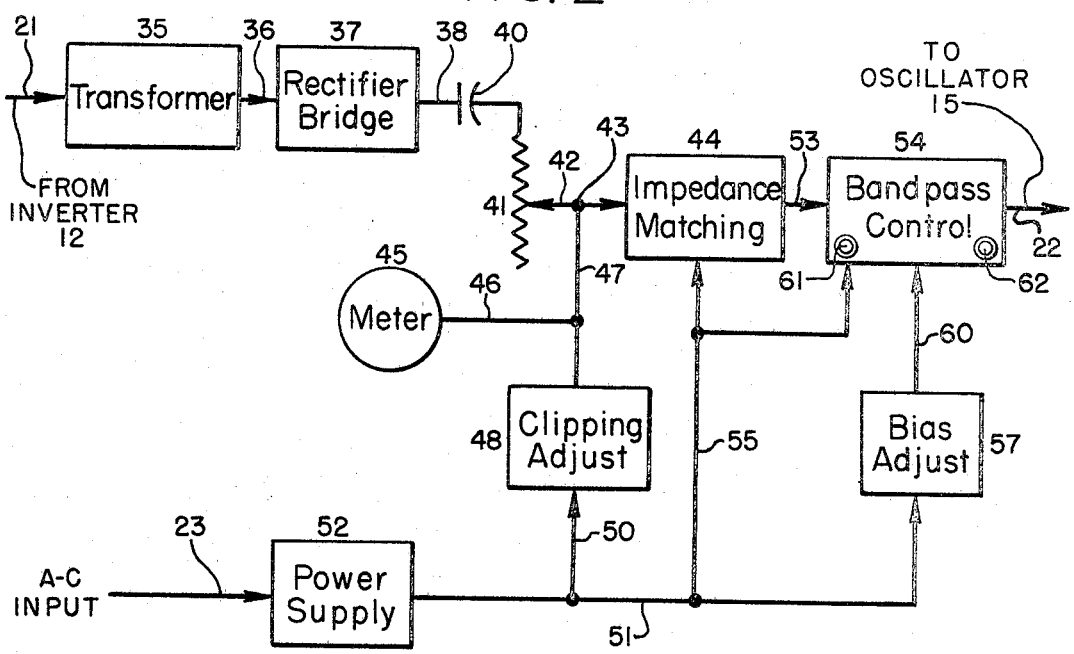
FIGURE 2 is a block diagram, partly in schematic form, illustrating major components of the demodulator arrangement shown in FIGURE 1.

FIGURE 3 is a schematic diagram depicting circuit details of the major portion of the demodulator arrangement shown in block form in FIGURE 2; and FIGURE 4 is a schematic diagram, partly in block form, depicting the remainder of the demodulator of FIGURE 2 and illustrating one arrangement for coupling the demodulator arrangement of this invention to the oscillator circuit of the motor control system.

GENERAL DESCRIPTION OF THE INVENTION

Figure 1:
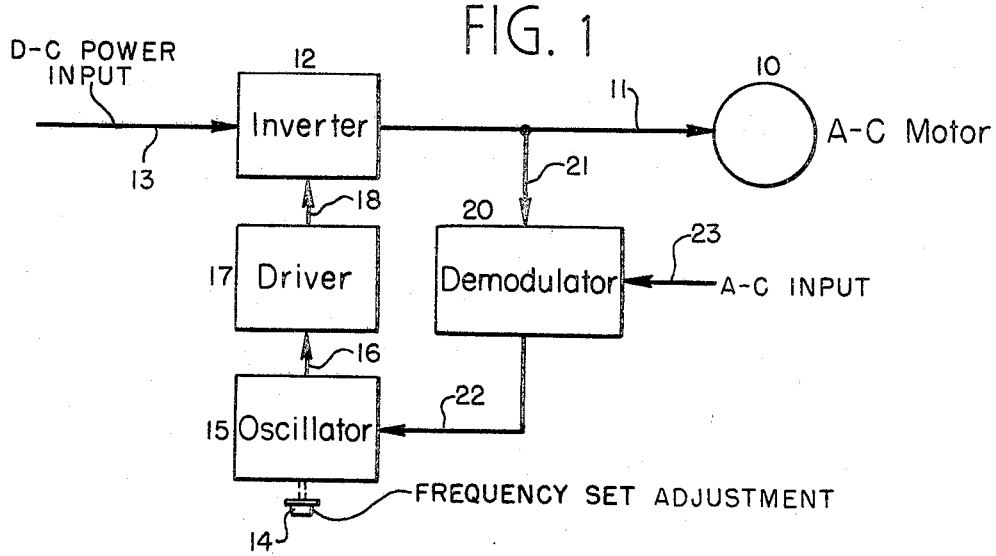
FIGURE 1 is a block diagram of a control system for regulating operation of an A-C motor, wherein the demodulator arrangement of this invention is depicted as a single block.

FIGURE 1 illustrates a control system in which an A-C motor 10 is energized over a line 11 from an inverter 12, so that any change in the frequency of the inverter A-C output voltage effects a related change in the speed of motor 10. Inverter 12 is energized with D-C voltage over a line 13 from any suitable source of D-C energy, such as a D-C regulator stage or a battery (not shown). A volts-per-cycle regulator can be provided and connected in a manner now known in this art to produce appropriate changes in the amplitude of the D-C voltage passed to the inverter, with consequent changes in the level of the inverter A–C output voltage, to conform the volts-per-cycle ratio of the voltage pased over line 11 to motor 10 with a preset ratio. The frequency of the inverter A-C output voltage is adjusted by manipulating knob 14 of oscillator 15 to pass a control signal over line 16, driver stage 17 and line 18 to regulate the times of conduction of the power-handling components within inverter 12 and correspondingly regulate the frequency of the inverter A-C output voltage.

In accordance with the present invention a demodulator circuit 20 is connected over line 21 to detect modulation appearing on the line 11. This modulation appears as changes in the level of current drawn by the motor, and can be detected or sensed as changes in the level of the A-C output voltage of the inverter. Upon detecting such a modulating signal and determining that it occurs within a preset frequency band, demodulator stage 20 passes a corrective signal over line 22 to oscillator 15 to modulate the oscillator timing pulses and correspondingly modulate the inverter output frequency in the appropriate direction to effect stabilization of the motor control system. The demodulator arrangement is itself energized over another input line 23 to which conventional alternating energy is supplied in a well known manner.

Considering now the block arrangement of FIGURE 2, the A-C signal received from inverter 12 over line 21 is passed over a transformer 35 and line 36 to rectifier bridge 37, which provides on output line 38 a composite input signal having both a D-C component and an A-C modulating signal. The composite input signal is related to the amplitude and to the frequency of the A-C signal received on line 21. The D-C component is blocked by capacitor 40 which applies the A-C modulation signal across a gain control potentiometer 41. Adjustable arm 42 of potentiometer 41 determines the percentage of the A-C modulation signal passing through capacitor 40 that is applied at reference junction 43 at the input side of impedance matching stage 44. A meter 45 is coupled over lines 46 and 47 to reference junction 43. A clipping adjust circuit 48 is coupled between conductor 47 and another conductor 50, in its turn coupled to a D-C energizing conductor 51 connected to the output side of power supply 52 which receives A-C input energy over line 33. Within stage 48 adjustable components are provided to regulate the positive and negative peak excursions of the A-C modulation signal appearing at junction 43. In addition, as will be explained in connection with FIGURE 3, the connection from meter 45 shown as a single line 46 is actually a double-pole, double-throw switch to facilitate observation of the adjustment of the clipping levels.

The output signal from impedance matching stage 44 is applied over a line 53 to bandpass control circuit 54, which also receives D-C energization over conductors 51 and 55. A bias adjusting stage 57 also receives D-C energy over conductor 51, and applies the adjusted bias voltage over conductor 60 to bandpass control circuit 54. A first adjusting means or knob 61 in bandpass control stage 54 is provided to effect adjustment of the low frequency cutoff level, and likewise another adjusting means 62 is provided in the same circuit to afford regulation of the high frequency cutoff level of this circuit. The output regulating signal from bandpass control circuit 54 is passed over line 22 to oscillator circuit 15.

DETAILED DESCRIPTION OF THE INVENTION

Turning to the schematic representation of FIGURE 3, and assuming that the A-C voltage on the output line 11 from inverter 12 is a three-phase voltage, a signal related to this voltage level and frequency is passed over conductors 21a, 21b and 21c to transformer 35 which is a conventional three-phase transformer. In this stage the level of the output voltage received over conductors 21a-21c is stepped down in a 5:1 ratio. In addition isolation is provided by transformer 35 between its output signal which appears on conductors 36a, 36b and 36c and the A-C signal at the output side of inverter 12.

Rectifier bridge 37 comprises six diodes connected in a conventional manner to rectify the alternating energy received over conductors 36a-36c and provide a D-C voltage between its output conductors 38a and 38b. This output voltage appears across resistor 65, shown connected between conductors 38a and 38b. The voltage developed across resistor 65 is a composite input signal, which includes both a D-C component of the component and an A-C modulation signal. The D-C component of the composite input signal is blocked by capacitor 40 and only the A-C modulation signal appears across potentiometer 41, shown coupled between conductors 66 and 38b.

Adjustable arm 42 is coupled through a resistor 67 to reference junction 43, at the input side of impedance matching stage 44. This impedance matching stage comprises a pair of emitter-follower connected transistors 68 and 70 each of which has a base or input connection referenced $b$, and emitter or common referenced $e$, and an output or collector connection referenced $c$. Collector 68c is connected both to conductor 71 and, through a resistor 72, to conductor 53 and to emitter 70e. Emitter 68e connected both to base 70b and, through a resistor 73, to conductor 74 and to collector 70c.

To energize impedance matching stage 44 and the other circuits, A-C input energy received over conductors 23a and 23b is applied over on-off switch 74 and a fuse 75 to the input side of regulated power supply 52. An indicating lamp 76 is coupled across the input conductors of the power supply to indicate closure of switch 74 when A-C energy is present on conductors 23a and 23b. The D-C output voltage from power supply 52 is applied between conductors 51a, 51b. A pair of filter capacitors 77, 78 are coupled in series between these two conductors, and the common connection of these filter capacitors is coupled over a conductor 80 to conductor 38b. A pair of resistors 81, 82 are coupled in parallel with the capacitors 77, 78. A resistor 83 is coupled between conductors 51a and 50a, and another resistor 84 is coupled between conductors 51b and 50b.

Within clipping adjust circuit 48, a pair of potentiometers 85 and 86 are coupled in parallel between conductors 50a and 50b. Movable arm 85a of potentiometer 85 is coupled over a diode 87 and conductor 47 to reference junction 43, and movable arm 86a of potentiometer 86 is coupled through another diode 88 to conductor 47.

Meter 45 has one side coupled through a resistor 90 to a first movable contact 91 of double-pole, double-throw switch 92. The other movable contact 93 is connected back to the other side of meter 45. Of the two fixed contacts shown above the movable contacts, fixed contact 94 is coupled to the common connection between diode 87 and potentiometer arm 85a, and fixed contact 95 is coupled to conductors 80 and 38b. Of the lower set of fixed contacts, contact 96 is coupled directly to contact 95, and the other contact 97 is coupled to the common connection between diode 88 and potentiometer arm 86a.

In bias adjust circuit 57, three potentiometers 100, 101 and 102 are all coupled in parallel between conductors 51a and 51b. Movable arm 100a of potentiometer 100 is coupled through a resistor 103 to the common connection between diodes 87 and 88 and conductor 47. Movable arm 101a is coupled through resistor 104 and over conductor 60a to the bandpass control circuit 54, and movable arm 102a is coupled over another resistor 105 and conductor 60b to the bandpass control circuit. The same energizing potentials applied over conductors 51a and 51b are passed over the conductor pairs 55a, 55b and 71, 74 to energize impedance matching circuit 44 and bandpass control circuit 54.

In bandpass control circuit 54 signals received over conductor 53 from the impedance matching circuit are passed through capacitors 106 and 107 to terminal 2 of a high pass amplifier 108 in low frequency cutoff circuit 54a. This component can also be considered as the low frequency cut off stage, in conjunction with the associated passive components which determine the lowest frequency to be passed by this portion of the bandpass circuit. The junction between input terminal 2 of amplifier 108 and capacitor 107 is coupled both to conductor 60a (bias level adjustment), and through potentiometer 110 to conductor 111, which is also coupled to conductor 119 and output terminal 7 of unit 108. A capacitor 112 is coupled between conductor 111 and the common point between capacitors 106 and 107. A series circuit including another capacitor 113 and a switch 114 is coupled in parallel with capacitor 112. Another potentiometer 115 is coupled between conductor 38b and the common connection between capacitors 106 and 107. Potentiometers 110 and 115, together with switch 114, can be considered the equivalent of the adjusting knob 61 shown in FIGURE 2 which can be manipulated to regulate the low frequency cutoff level of bandpass control circuit 54.

The terminals 1 and 3 of unit 108 are coupled together and connected to conductor 38b. The upper terminal 8 of unit 108 is connected to conductor 71, and terminal 4 is coupled to conductor 74. Terminal 6 is coupled through a series circuit including a resistor 116 and a capacitor 117 to conductor 38b. Output terminal 7 of the low frequency cutoff amplifier is coupled not only to conductors 111 and 119 but also, through a resistor 118, to conductor 38b.

A capacitor 120 (FIGURE 4) is connected in parallel with resistor 118 at the input side of high frequency cutoff circuit 54b. Low pass amplifier 121 is similar to the first unit 108, and terminal 2 of amplifier 121 is coupled through first and second potentiometers 122, 123 to output terminal 7 of amplifier 108. Another potentiometer 124 has one end coupled to the common connection between potentiometers 122 and 123, and has its other end connected to a conductor 125. A capacitor 126 is coupled between conductor 125 and the common connection between potentiometer 122, input terminal 2 of amplifier 121, and conductor 60b (bias level adjust). Conductor 125 is also coupled to output terminal 7 of unit 121 and to output conductor 22a.

A capacitor 127 is coupled between conductor 38b and the common connection between potentiometers 122, 123. In parallel with capacitor 127 is a series circuit including a switch 128 and another capacitor 130. Potentiometers 122, 123 and 124, together with switch 128, can be jointly considered as the equivalent of the adjusting knob 62 shown generally in the bandpass control circuit 54 in FIGURE 2.

The 1 to 3 terminals of amplifier 121 are connected together and to conductor 38b, which is also connected to output conductor 22b. Terminal 8 of unit 121 is coupled to conductor 71, and to energizing conductor 55a. Terminal 4 of unit 121 is coupled to conductor 74, which is coupled to energizing conductor 55b. Terminal 6 is coupled through a series circuit including a resistor 131 and a capacitor 132 to conductor 22b. Another resistor 133 is coupled between the output conductors 22a, 22b.

It is emphasized that in this embodiment the output regulating signal produced to offset the undesired modulation signal is not applied to the oscillator circuit 15 as a sustained D.C. signal. If it were it would correspondingly modify the frequency control signal produced by the oscillator and maintain the modification. The D-C portion of the regulating signal is eliminated and only the A-C portion is applied, so that the "set" accuracy of the oscillator is not affected.

The output regulating (or modulation correction) signal is applied over conductors 22a, 22b to the oscillator circuit 15 as shown in the right hand portion of FIGURE 4. The oscillator circuit includes an adjustable potentiometer 14 for regulating the upper limit of the control signal available from frequency setting potentiometer 135; adjusting potentiometer 136 regulates the lower frequency limit. The end terminals of potentiometer 14 are connected to conductors 137 and 16b. Movable arm 14a of this potentiometer is coupled through fine adjusting potentiometer 135 to the arm 136a of potentiometer 136, one end of which is coupled to conductor 16b. The other end of potentiometer 136 is coupled to conductor 137. Conductor 22a is coupled to movable potentiometer arm 135a, and the other input conductor 22b is coupled to the input side of a voltage controlled oscillator 138. This oscillator also includes a reference connection to conductor 16b and an output connection over conductor 16a. Oscillator 138 is of a well known type which, when the circuit is energized by application of a unidirectional potential difference V between conductors 137 and 16b, provides a train of output pulses or timing signals between conductors 16a, 16b. The frequency of these timing pulses is a function of the amplitude of the D-C potential V. Accordingly any transient modulating (or output regulating) signal inserted between potentiometer arm 135a and pulse generating circuit 138 by application over conductors 22a, 22b will produce a modification of the frequency of the timing signals on conductors 16a, 16b of the appropriate extent and of the proper sense to offset the modulation signals which would otherwise be fed back from the motor to the inverter.

OPERATION OF THE INVENTION

When the equipment is energized switch 74 is closed and the unidirectional voltage suppled by power supply 52 energizes the other circuits. Switch 92 is displaced to the upper position where contacts 91, 93 engage contacts 94, 95 and the positive clipping level of the A-C modulation signal applied over potentiometer 41 to the impedance matching stage 44 is set by adjusting arm 85a of potentiometer 85. Switch 92 is then displaced so that contacts 91, 93 engage fixed contacts 96, 97 and the negative clipping level is regulated by adjustment of potentiometer arm 86a of potentiometer 86. Bias adjust potentiometers 100, 101 and 102 are adjusted to regulate the gain through the impedance matching stage and bandpass control circuit 54.

To regulate the low frequency cutoff of the high pass circuit 54a including amplifier 108, potentiometers 110 and 115 are adjusted and switch 114 likewise adjusted to regulate the parameters of this circuit. In a similar manner the high frequency cutoff of the low pass circuit 54b including amplifier 121 is regulated by adjusting the position of switch 128 and the effective resistance values of potentiometers 122–124. These various controls allow for a considerable latitude of undesired modulation correction for various control systems, in that different types of inverters can be connected to various types of A-C motors to provide different ranges of interactions which must be compensated to avoid the undesired modulation and stabilize the complete system.

Solely to assist those skilled in the art to make and use the invention, and in no sense by way of limitation, a table of typical component identification and values found operable in a preferred embodiment are set out below.

| Components: | Identification or value |
|---|---|
| 108, 121 | Fairchild, uA702C |
| 68 | 40234 |
| 70 | 2N4037 |
| 37 | A13B2(6) |
| 87, 88 | 1N914 |
| 40 | microfarads 40 |
| 77, 78 | do 2 |
| 106, 107, 112 | do 8 |
| 113 | do 3 |
| 117, 132 | do 0.01 |
| 120 | picofarads 4,700 |
| 126 | microfarads 1 |
| 127 | do 2.4 |
| 130 | do 0.4 |
| 41 | 10K |
| 85, 86 | ohms 100 |
| 100, 101, 102, 110, 115, 122, 123, 124 | 100K |
| 65, 133 | 1K |
| 67, 90, 118 | 10K |
| 72 | ohms 300 |
| 73 | 4.7K |
| 81, 82, 83, 84 (5 watts) | ohms 50 |
| 103 | 136.7K |
| 104, 105 | 640K |
| 116, 131 | ohms 20 |

No precise values are given for oscillator circuit 15 because the demodulator arrangement of this invention can be utilized with a multiplicity of different oscillator arrangemnets. In the illustrated embodiment the transient output regulating signal produced by the demodulator and passed to the oscillator circuit is applied in series in one of the two lines which supplies the D-C control voltage to the voltage controlled oscillator, the frequency of its output timing pulses varying in accordance with variations in the level of the applied D-C voltage and the demodulating signal.

Other oscillators, such as a resistance-controlled oscillator where the effective resistance (and thus the frequency of the oscillator output signal) is varied in accordance with the modulating parameter, may also be employed. Likewise the demodulator output signal can be applied to a summing junction between the frequency set potentiometer and the controlled oscillator. It is only necessary that the connection establish the requisite compensation for the undesired modulation signal without a long-term change in the frequency of the signal produced by the controlled oscillator.

Although only a particular embodiment of the invention has been shown and described, it will be apparent to those skilled in the art that various changes and modifications may be made therein. It is therefore the intention in the appended claims to cover all such changes and modifications as may fall within the true spirit and scope of the invention.

What is claimed is:

1. In combination with a motor control system in which an inverter is connected to supply A-C voltage for energizing an A-C motor, and an oscillator is connected to supply timing pulses to regulate the frequency of the inverter A-C output voltage and correspondingly regulate the motor speed, the improvement which comprises:
   a demodulator arrangement, including
   an input circuit connected to provide an A-C modulation signal, having no D-C component, related to the frequency of the A-C voltage supplied by the inverter to the motor;
   a bandpass control circuit, coupled to said input circuit, including means for regulating the low and high frequency cutoff levels as well as the phase shift of the A-C modulation signal to provide an output regulating signal; and
   means for passing said output regulating signal to said oscillator, thus changing the inverter output frequency to modify the motor torque angle and compensate for an undesired modulating signal present at the input circuit of the motor and stabilizing the motor control system.

2. A demodulator arrangement as claimed in claim 1, wherein said input circuit includes rectifier means connected to provide a composite input signal including both a D-C component and said A-C modulation signal, and means coupled to said rectifier means for blocking said D-C component and passing only said A-C modulation signal.

3. A demodulator arrangement as claimed in claim 1 wherein an adjustable clipping means is connected to determine the excursions of said A-C modulation signal before the A-C modulation signal is applied to the bandpass control circuit.

4. A demodulator arrangement as claimed in claim 1 wherein the bandpass control circuit includes first and second adjusting means for varying the low and high frequency cutoff levels established in the bandpass control circuit.

5. In combination with a motor control system in which an inverter is connected to supply A-C voltage for energizing an A-C motor, an oscillator is connected to supply timing pulses to regulate the frequency of the inverter A-C output voltage, and the oscillator includes adjusting means for varying the frequency of the timing pulses to correspondingly vary the frequency of the inverter A-C output voltage and effect a related variation in the motor speed, the improvement which comprises:
   a demodulator arrangement, including
   input means connected to provide a composite input signal related to the amplitude and to the frequency of the A-C voltage supplied by the inverter to the motor, which composite input signal includes both a D-C component and an A-C modulation signal;
   circuit means coupled to the input means for blocking the D-C component and passing only the A-C modulation signal of said composite input signal;
   a bandpass control circuit, coupled to said circuit means, including means for regulating the low and high frequency cutoff levels of the A-C modulation signal to provide an output regulating signal;
   adjustable clipping means connected to determine the excursions of said A-C modulation signal before such signal is applied to the bandpass control circuit; and
   means for passing the output regulating signal produced by said bandpass control circuit to said oscillator, thus changing the inverter output frequency to modify the motor torque angle and compensate for an undesired modulating signal present at the input circuit of the motor and stabilizing the motor control system.

6. A demodulator arrangement as claimed in claim 5 wherein the bandpass control circuit includes first and second adjusting means for varying the low and high frequency cutoff levels established in the bandpass control circuit.

7. A demodulator arrangement as claimed in claim 6 and further comprising a bias adjusting circuit connected to regulate the bias levels at said first and second adjusting means in the bandpass control circuit.

8. A demodulator arrangement as claimed in claim 5 wherein an impedance matching stage is coupled between said circuit means and said bandpass control circuit.

9. A demodulator arrangement as claimed in claim 8 wherein a meter is connected through a switch to provide an indication of the signal level between said circuit means and said impedance matching stage, to facilitate adjustment of the positive-going and negative-going levels of said A-C modulation signal before such signal is applied to the bandpass control circuit.

10. In combination with a motor control system in which an inverter is connected to supply A-C voltage for energizing an A-C motor, an oscillator is connected to supply timing pulses to regulate the frequency of the inverter A-C output voltage, and the oscillator includes adjusting means for varying the frequency of the timing pulses to correspondingly vary the frequency of the inverter A-C output voltage and effect a related variation in the motor speed, the improvement which comprises:

a demodulator arrangement, including
   input means including a transformer connected to provide an A-C signal related to the inverter output voltage and a rectifier circuit, coupled to the transformer, for rectifying the A-C signal and providing a composite input signal having both a D-C component and an A-C modulation signal related to undesired modulation of the motor torque angle;
   a capacitor coupled to the rectifier circuit to block said D-C component and pass only said A-C modulation signal;
   a potentiometer coupled between said capacitor and a reference junction to regulate the percentage of the A-C modulation signal passed through the capacitor which is applied to the reference junction;
   a clipping adjust circuit coupled to said reference junction and including adjustable means for regulating the positive-going and negative-going excursions of said A-C modulation signal;
   a bandpass control circuit coupled to said reference junction, including a high pass amplifier circuit with first adjusting means connected to regulate the low frequency cutoff level, and a low pass amplifier circuit with second adjusting means connected to regulate the high frequency cutoff level of the A-C modulation signal to provide an output regulating signal; and
   means for passing the output regulating signal to said oscillator, thus changing the inverter output frequency to modify the motor torque angle and compensate for an undesired modulating signal present at the input circuit of the motor and stabilizing the motor control system.

11. A demodulator arrangemnt is claimed in claim 10 wherein a bias level adjusting circuit is coupled to said bandpass control circuit, the bias level adjusting circuit including a first adjusting means for regulating the bias level of said high pass amplifier circuit and a second adjusting means for regulating the bias level of said low pass amplifier circuit.

12. A demodulator arrangement as claimed in claim 10, including a meter, and a switch connected to selectively couple said meter in circuit with said reference junction and said clipping adjust circuit, to provide a visible indication of the positive-going and negative-going excursions of the A-C modulation signal.

References Cited
UNITED STATES PATENTS

| | | | |
|---|---|---|---|
| 3,331,003 | 7/1967 | King | 318—227 |
| 3,343,063 | 9/1967 | Keeney et al. | 318—231 |
| 3,351,835 | 11/1967 | Borden et al. | 318—230 |

ORIS L. RADER, Primary Examiner

K. L. CROSSON, Assistant Examiner

U.S. Cl. X.R.

318—231